(12) United States Patent
Ragutski et al.

(10) Patent No.: US 8,732,304 B2
(45) Date of Patent: May 20, 2014

(54) METHOD AND SYSTEM FOR ENSURING AUTHENTICITY OF IP DATA SERVED BY A SERVICE PROVIDER

(75) Inventors: Israel Ragutski, Mevasseret Zion (IL); Nimrod Luria, Netanya (IL)

(73) Assignee: Foresight Information Security Technologies Ltd., Kfar Neter (IL)

( * ) Notice: Subject to any disclaimer, the term of this patent is extended or adjusted under 35 U.S.C. 154(b) by 0 days.

(21) Appl. No.: 13/345,408

(22) Filed: Jan. 6, 2012

(65) Prior Publication Data

US 2013/0173782 A1  Jul. 4, 2013

(30) Foreign Application Priority Data

Dec. 29, 2011 (IL) .......................................... 217279

(51) Int. Cl.
*G06F 15/173* (2006.01)
(52) U.S. Cl.
USPC ................................ 709/224; 726/4; 726/21
(58) Field of Classification Search
USPC ....................................... 709/224; 726/4, 21
See application file for complete search history.

(56) References Cited

U.S. PATENT DOCUMENTS

| 7,296,274 | B2 * | 11/2007 | Cohen et al. ................... 719/315 |
| 7,565,550 | B2 | 7/2009 | Liang et al. |
| 8,370,938 | B1 * | 2/2013 | Daswani et al. ................. 726/23 |
| 2007/0289015 | A1 * | 12/2007 | Repasi et al. .................... 726/22 |
| 2008/0262991 | A1 | 10/2008 | Kapoor et al. |
| 2009/0287653 | A1 | 11/2009 | Bennett |
| 2010/0199345 | A1 | 8/2010 | Nadir |
| 2011/0138465 | A1 * | 6/2011 | Franklin et al. .................. 726/23 |
| 2011/0167108 | A1 | 7/2011 | Chen et al. |
| 2011/0307955 | A1 * | 12/2011 | Kaplan et al. ................... 726/23 |

FOREIGN PATENT DOCUMENTS

WO  WO 2010/029036 A1  3/2010

OTHER PUBLICATIONS

International Search Report and Written Opinion mailed Aug. 6, 2013 for Application No. PCT/IL2012/000388, 22 pgs.
Shadi Aljawarneh et al., "Security policy framework and algorithms for web server content protection", downloaded from: http://nrl.northumbria.ac.uk/917/1/Security_policy_framework_and_algorithms_for_web.pdf on Jul. 25, 2013, 9 pgs.
Shadi Aljawarneh et al., "Design and experimental evaluation of Web Content Verification and Recovery (WCVT) system: A survivable security system", Proceedings ACSF 2008: the 3$^{rd}$ Conference of Advances in Computer Security and Forensics, Jul. 10, 2008, pp. 1-7, downloaded from: http://nrl.northumbria.ac.uk/2293/1/5_AlJawarneh_Laing_Vickers2008_(2).pdf on Jul. 25, 2013.

* cited by examiner

*Primary Examiner* — Ario Etienne
*Assistant Examiner* — Kidest Mendaye
(74) *Attorney, Agent, or Firm* — Moser Taboada

(57) ABSTRACT

A computer-implemented method and system identifies whether web content stored in a repository deviates from authentic web content being web content that is approved by authorized personnel of the web content prior to serving to a client requesting the web content. Web communications to the repository are monitored and web content is intercepted and analyzed in a safe environment for establishing that the web content conforms to a predetermined standard. If not, a web host serving the web content is alerted. In one embodiment, the web content is intercepted and analyzed prior to serving to the client and is served to the client only if either authenticated or after suitable modification to render it acceptable.

12 Claims, 3 Drawing Sheets

METHOD AND SYSTEM FOR ENSURING AUTHENTICITY OF IP DATA SERVED BY A SERVICE PROVIDER

CROSS-REFERENCE TO RELATED APPLICATION

This application claims benefit of Israel Patent Application No. 217279 filed Dec. 29, 2011, which is herein incorporated by reference in its entirety.

FIELD OF THE INVENTION

This invention relates generally to security of network data and in particular to data integrity of web sites.

BACKGROUND OF THE INVENTION

There is a wealth of prior art relating to data security systems for the Internet, which are intended to guard against undesired downloading of viruses, spyware adware, worms, Trojan horses and other malicious code.

US 2009/0287653 discloses an Internet browser adapted to prevent access to portion of contents that contain malware.

WO2010029036 discloses a malware detection method implemented within a computer based on checking for a valid digital signature and verifying that the signature belongs to a trusted source. If the signature cannot be verified as belonging to a trusted source a malware scan is carried out.

US 2008/0262991 discloses systems and methods for processing data flows, which use a set of artificial neurons for pattern recognition, such as a self-organizing map, in order to provide security and protection to a computer or computer system and which support unified threat management based at least in part on patterns relevant to a variety of types of threats that relate to computer systems, including computer networks. The system detects security threats and intrusions across accessible layers of the IP-stack by applying content matching and behavioral anomaly detection techniques based on regular expression matching and self-organizing maps.

U.S. Pat. No. 7,565,550 discloses a network level virus monitoring system capable of monitoring a flow of network traffic in any of a number of inspection modes depending upon the particular needs of a system administrator. The system includes a controller storing a rules engine used to store and source a plurality of detection rules for detecting computer viruses and worms, and using statistical results of observed abnormal events defined in policies and in the plurality of detection rules. An abnormal behavior report is generated and is evaluated by one of the server computers to determine an action to perform.

U.S. Pat. No. 7,296,274 discloses a method and apparatus providing deception and/or altered execution of logic in an information system. In specific embodiments, deceptions and/or protections are provided by intercepting and/or modifying operation of one or more system calls of an operating system.

Known systems and methods are generally directed to the need to protect the client machine from malware that is present on the client machine. However, rogue operators are also known to hack into a web provider's server and corrupt data that is subsequently downloaded by a client, who is thereby presented with information that was not intended by the web provider. The resulting web page as seen on the machine not only presents factually incorrect data to the client, but also misrepresents the web provider and militates against the web provider conveying his message.

However, provided that no malware is embedded in the web page, known systems will do nothing to detect that the content of the web page is corrupted. Even where malware is embedded, known systems may intercept the malware and block and possibly alert the end-user but they are unable to check the integrity of the web content.

SUMMARY OF THE INVENTION

It is therefore an object of the present invention to provide a network security system and method that checks the integrity of the web content at source and allows it to be downloaded to a client machine only if it is a faithful representation of what the owner intended.

To this end, there is provided in accordance with one aspect of the invention a computer-implemented method for identifying whether web content stored in a repository deviates from authentic web content being web content that is approved by an authorized personnel of the web content prior to serving to a client requesting said web content, said method comprising:
monitoring web communications to said repository;
intercepting said web content prior to serving a client;
analyzing the web content in a safe environment for establishing that the web content conforms to a predetermined standard; and
alerting a web host serving the web content if the web content does not conform to said standard.

In accordance with another aspect of the invention, there is provided a computer-implemented method for preventing web content stored in a repository from being served to a client requesting said web content, said method comprising:
monitoring web communications to said repository;
intercepting said web content prior to serving a client;
analyzing the web content in a safe environment for establishing that the web content operates as expected; and
serving the web content to the client only if the web content operates as expected.

In accordance with another aspect of the invention, there is provided a device for identifying that web content stored in a repository maybe suspicious prior to serving to a client requesting said web content via a data communications network, said device comprising:
a communications port for allowing a client to access said repository for requesting said web content,
a monitoring unit having a data communications port for coupling to the data communications network for intercepting web content uploaded by the repository to a client;
an analysis unit coupled to the monitoring unit for receiving the web content intercepted by the monitoring unit and analyzing the received web content in a safe environment for establishing that the web content conforms to a predetermined standard; and
an alert unit coupled to the analysis unit and responsive to the web content not conforming to said standard for alerting a web host serving the web content.

In accordance with yet another aspect of the invention, there is provided a device for preventing web content stored in a repository from being served to a client requesting said web content a data communications network, said device comprising:
a communications port for allowing a client to access said repository for requesting said web content,
a monitoring unit having a data communications port for coupling to the data communications network for intercepting web content uploaded by the repository to a client;

an analysis unit coupled to the monitoring unit for receiving the web content intercepted by the monitoring unit and analyzing the received web content in a safe environment for establishing that the web content conforms to a predetermined standard; and a communications output coupled to coupled to the analysis unit and responsive to the web content not conforming to said standard for blocking the web content to the client.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following description of some embodiments, identical components that appear in more than one figure or that share similar functionality will be referenced by identical reference symbols.

Figure 1:
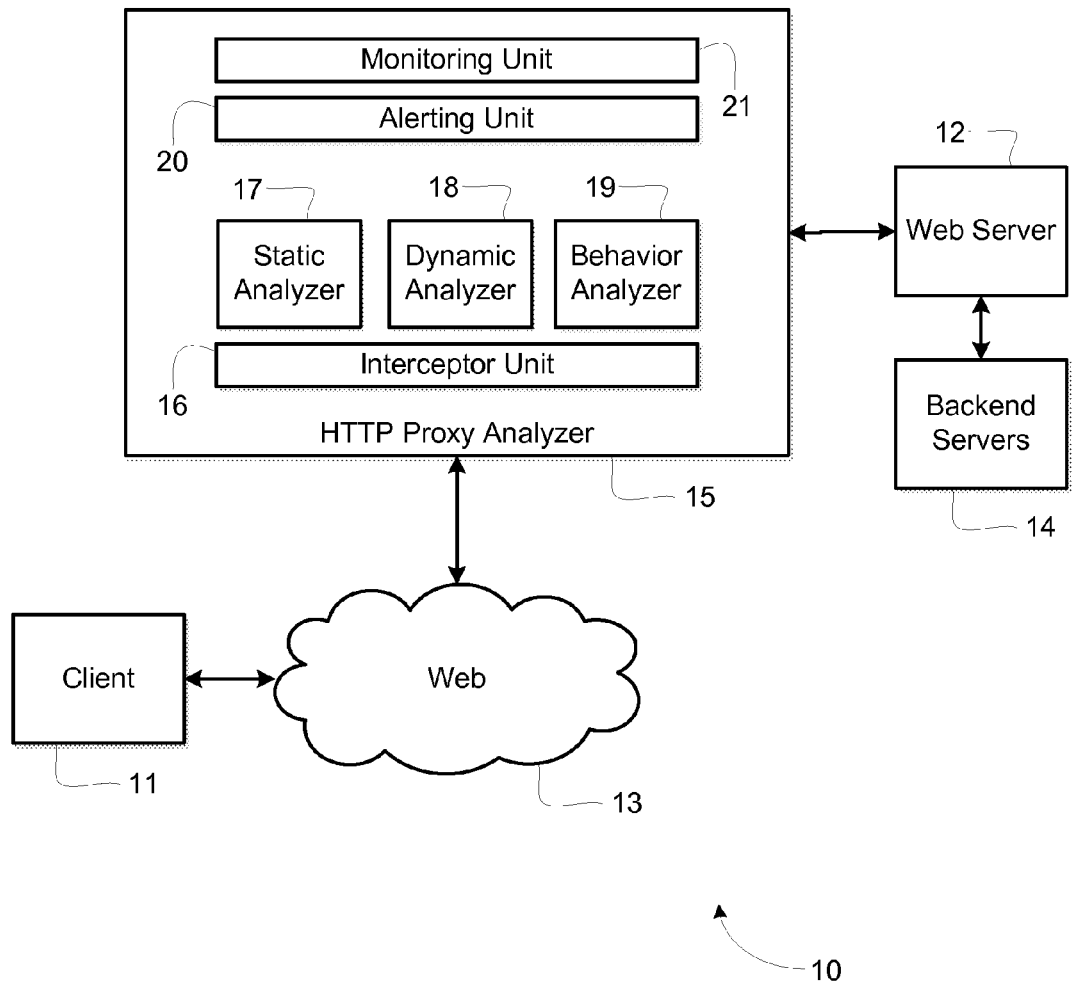
FIG. 1 is a schematic representation of a network configuration according to an embodiment of the invention for inline analyzer deployment.

FIG. 1 is a schematic representation of a system 10 according to the invention for analyzing HTTP in order to identify whether web content stored in a web server 12 (constituting a repository) deviates from authentic web content. In the context of the invention and the appended claims, authentic web content is web content that is approved by authorized personnel of the web content prior to serving to a client F100 requesting the web content.

Web communications to the web server 12 are monitored in-line and the web content is intercepted prior to serving the client 11 by using custom HTTP proxy software, operating in accordance to IETF RFC 2616 in the role of a transparent HTTP gateway, or as a passive network traffic sniffing device, which is located in a network in such a way that allows interception or sniffing of traffic between the client requesting the web content and the origin server (the web host) serving the content. The proxy software decodes and inspects all HTTP requests (coming from the clients) and responses (coming from the origin servers). It can pass them on as-is, or in a modified form, or replace them, or block them entirely, depending on policy settings. The different possible behaviors and the circumstances where each behavior is applied are detailed below.

Thus, referring in more detail to FIG. 1 there is shown a system 10 comprising a client 11 that communicates with a web server 12 via an IP network 13 such as the Internet. The web server 12 is typically backed up by one or more backend servers 14. The server 12 is coupled to the IP network 13 via an HTTP proxy analyzer 15, which comprises an interceptor unit 16 that intercepts communications between the client 11 and the server 12. Specifically, traffic in both directions is intercepted even though, as will be able explained below in more detail, only the data from the server is analyzed and filtered. Nevertheless, data from the client to the server is also intercepted in order to establish the identity of the client and the HTTP requests generated thereby in order to be able to convey the web responses to the correct client in respect of the appropriate client request. Within the HTTP analyzer 15, the interceptor unit 16 is coupled to a static analyzer 17, a dynamic analyzer 18 and a behavior analyzer 19. The static analyzer 17 is configured to analyze static content of a web page downloaded from the web server 12 to the client 11 prior to its reaching the client. The dynamic analyzer 18 and behavior analyzer 19 perform equivalent tasks for the dynamic content and behavior of the web page, in order to establish whether the static and dynamic content and behavior of the web page about to be conveyed to the client in response to a client request conforms to that of the authentic web page.

The HTTP analyzer 15 may be adapted to obtain an image that the web content displays on a display device of the client and to compare the image with a predetermined representative image. The dynamic analyzer 18 may determine if the dynamic features have changed or whether they conform to a predetermined format. The behavior analyzer 19 includes a simulator for simulating a user experience with the web content in order to determine whether the user experience conforms to a predetermined authenticated experience. Since the user experience is typically browser-dependent, the simulator may be configured to obtain an identity of a web browser requesting the web content and perform a browser-specific simulation. The simulator may also be configured to iteratively simulate cumulative partial web content intercepted by the device for determining that the cumulative partial web content conforms to the predetermined authenticated experience relating to the partial web content and to release the partial web content to the client while maintaining a copy for subsequent analysis.

An alerting unit 20 within the HTTP analyzer 15 generates an alert signal that is indicative of the web page not conforming to that of the authentic web page. A monitoring unit 21 monitors the alert signal and takes appropriate action if the web page departs from the authentic web page. For example, the monitoring unit 21 may automatically block traffic from the web server to the client. Alternatively or additionally it may provide a suitable warning to the web host, who may then decide to block further traffic and to investigate the source of corruption.

In the above-described network configuration where in-line deployment is used, traffic between the client 11 and the web server 12 can only pass via the HTTP analyzer 15. This requires that data be buffered and causes a slight delay while the data is analyzed and subsequently released, possibly after modification as will be explained below with reference to FIG. 3. While the delay is a potential drawback of in-line analysis, such an approach provided the advantage that inauthentic data is blocked and can never reach the client. This consideration may well be paramount for high-security applications.

Figure 2:
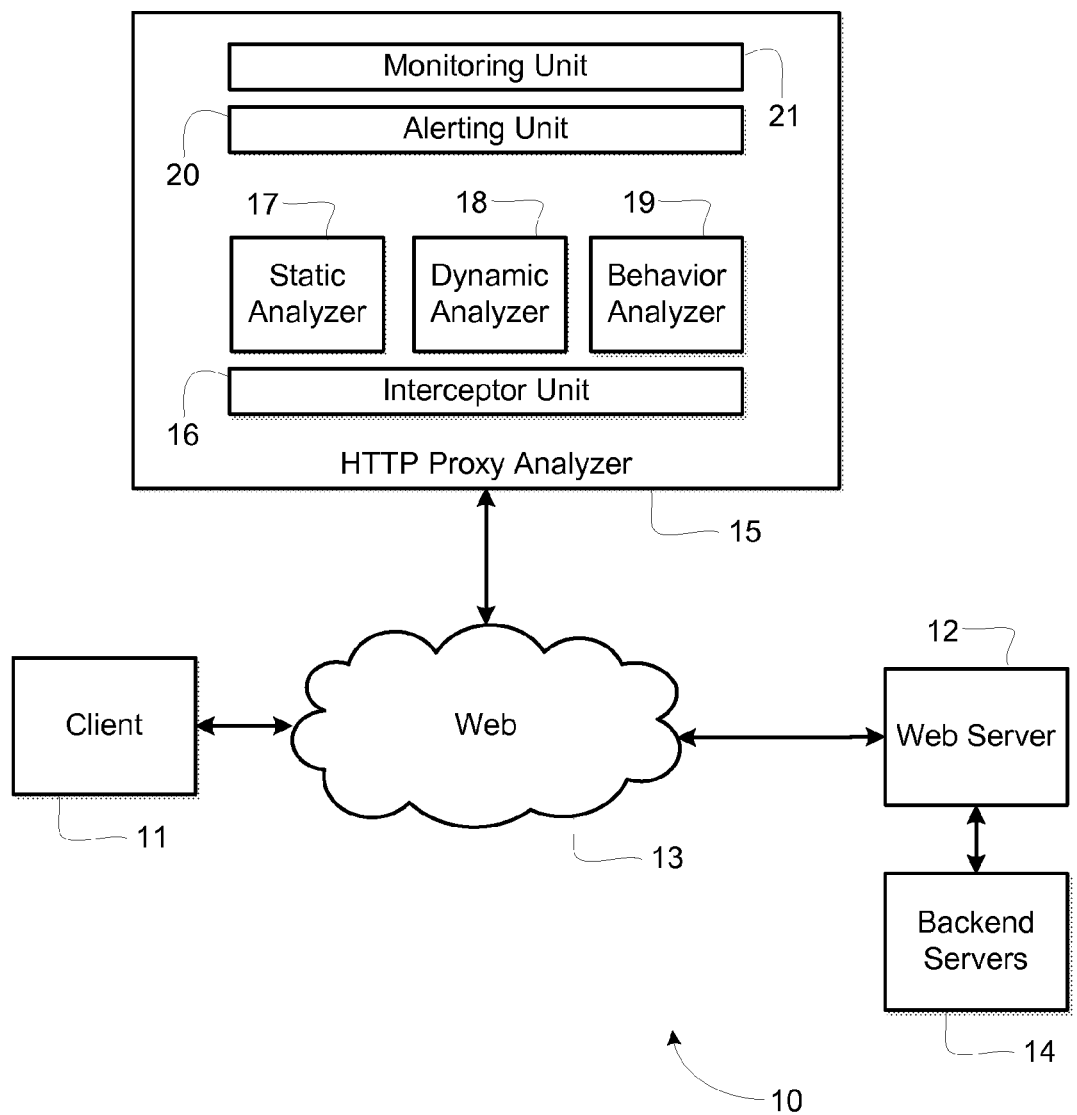
FIG. 2 is a schematic representation of a network configuration according to an alternative embodiment of the invention for out-of-band analyzer deployment.

FIG. 2 shows an alternative network configuration that may be used for out-of-band analyzer deployment. As may be seen, the system 10 is identical to that shown in FIG. 1 except for the fact that in FIG. 2 traffic between the client 11 and the web server 12 passes directly via the web 13 without passing first through the HTTP analyzer 15, and a copy is effectively siphoned off and analyzed by the HTTP analyzer 15. Thus, in such a configuration, data is analyzed independent of its being conveyed to the client and the HTTP analyzer 15 cannot retroactively block data that has already been conveyed. However, it can provide an alert signal to which the monitoring unit 21 is responsive for taking appropriate action if the web page departs from the authentic web page. For example, the monitoring unit 21 may provide a suitable warning to the web host, who may then decide to block further traffic and to investigate the source of corruption.

Figure 3:
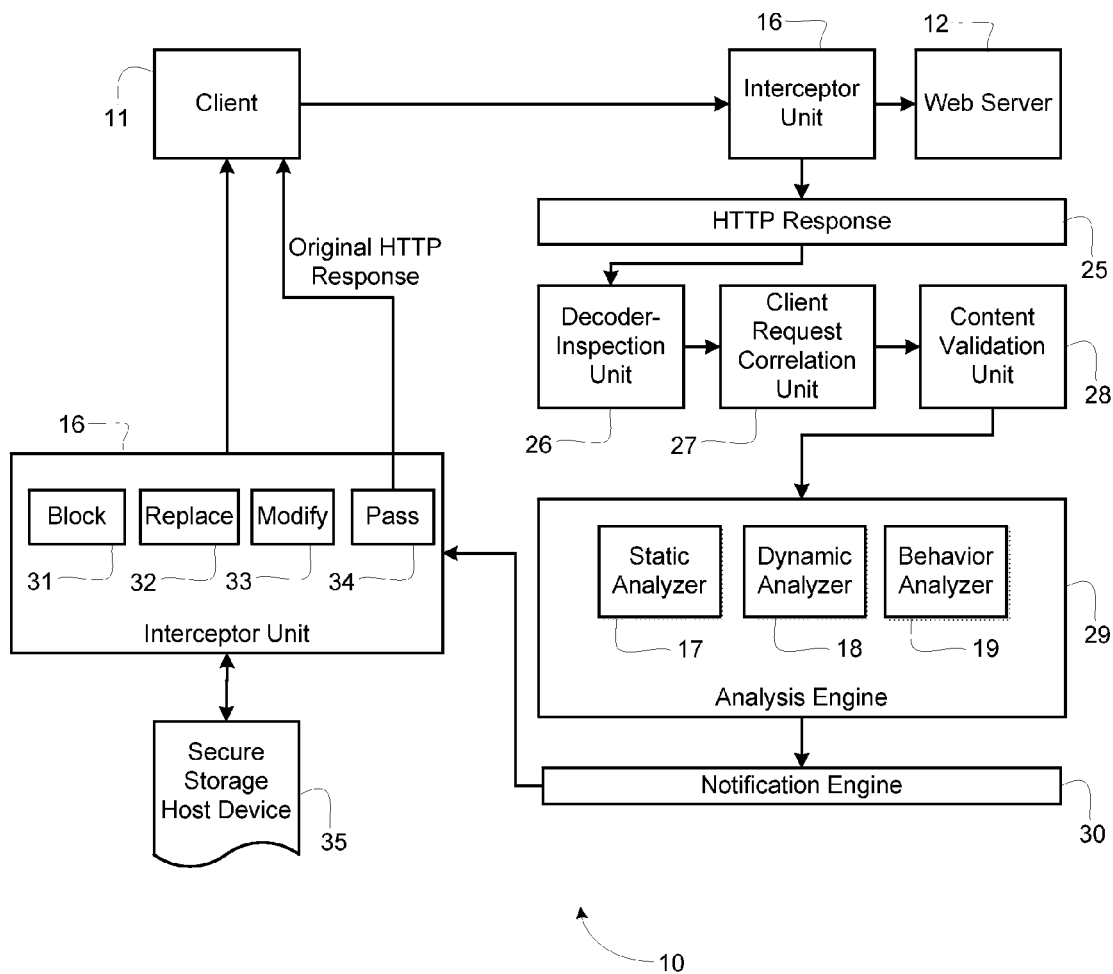
FIG. 3 is a schematic representation of the network shown in FIG. 1 showing in more detail the principal operations carried out in analyzing HTTP.

FIG. 3 shows in somewhat more detail the processes carried out by the above described modules in both network configurations. Thus, the interceptor unit 16 intercepts IP packets conveyed from the web server 12 prior to passing to the client 11. The intercepted data, shown as HTTP response 25 in the figure, is unwrapped by a decoder/inspection unit 26 that ensures that the HTTP response 25 is in a form that is suitable for subsequent analysis. For example, the HTTP response 25 may arrive compressed, in which case it is decompressed by the decoder/inspection unit 26. Likewise, the HTTP response 25 may be part of a larger chunk of data that is transmitted in chunks and needs to be stitched together by the decoder/inspection unit 26 prior to analysis. The unwrapped data is then correlated to a specific client request by a client request correlation unit 27 so that the interceptor unit 16 knows to which client to convey the HTTP response, possibly after modification. The content is then passed to a content validation unit 28 that prepares the content for analysis by the analysis engine 29, which in effect is functionally equivalent to the static analyzer 17, dynamic analyzer 18 and behavior analyzer 19 described above. A notification engine 30 is coupled to the analysis engine 29 and is responsive to the alert signal generated thereby for controlling the interceptor unit 16 how to act. Thus, the interceptor unit 16 may be adapted to block 31 the HTTP response 25 from being conveyed onward to the client, or it may replace 32 it with different HTTP data (i.e. replace the complete data packet), or it may modify 33 it (i.e. make partial changes to the data packet) or it may pass 34 the packet as received to the client without change.

The intercepted web content is analyzed in a safe environment for establishing that the web content conforms to a predetermined standard. To this end, the HTTP response 25 is stored in a secure storage host device 35 prior to being analyzed. The web content (i.e. the content payload of the HTTP responses sent by the origin servers) is analyzed in two kinds of ways. First, the content is analyzed by custom application code invoked by the HTTP proxy. In this way the content is checked for any condition that can be described statically by software code. Secondly, the content is fed to a standard browser application running in a virtual machine controlled by the proxy, and the behavior of the browser is observed as a black box. In this way the actual behavior of complex web content may be simulated so as to permit prediction as to whether it may be safely sent to the client requesting it.

If the web content does not conform to the standard, an alert is communicated to a web host serving the web content. For example, if one of the analyses above determines that the web content does not satisfy the configured security policy, one of the possible actions that can be taken in response is to notify a separate server of the condition. The notified server may be the same server acting as the origin web host of the content, or another server.

According to the invention, web content is analyzed in order to establish whether it is authentic. When web content is determined not be authentic, various actions can then be taken such as alerting the web host as described above. A security system operating according the approach described with reference to FIG. 2 is passive since it allows the web host to determine what corrective action to take.

In contrast to the passive approach of FIG. 2, the system described with reference to FIG. 1 is active and prevents web content that is found not be authentic from being served to the client. The web content is monitored, intercepted and analyzed as described above but is served to the client only if the web content operates as expected. Thus, in response to notification that the web content does not conform to what is expected, the client that originated the request can be blocked (i.e. no web content is served). Alternatively, the corrupt web content can be replaced with content previously learned to be safe and conformant to security policy, or it can be replaced with a configurable error message or the client can be redirected to an alternative host storage device to receive secure content.

In accordance with some embodiments, analysis of the web content includes "static comparison". This compares the content as an HTTP payload (i.e. a byte stream) to a previously served safe payload stored in an internal database (keyed by the URL (uniform resource locator) to which the request is made). The payload is approved only if the two payloads are identical (compared as byte streams).

One way to determine whether static content has changed includes computing a signature of the static content and comparing the signature with a known signature of valid content. Alternatively, a "signature"—a cryptographic hash of the payload data—may be stored in the product's internal database, rather than a complete copy of the payload. The hash of the web content returned by the origin server is computed, and the content is deemed to pass the analysis if the hash is equal to the hash of the known-valid content stored in the database.

In accordance with some embodiments, analysis of the web content includes "dynamic comparison", which determines whether the web content includes dynamic content and, if so, whether the dynamic content conforms to a predetermined format.

Another analysis which can be carried out on the web content is "structural analysis" whereby, instead of treating the response payload as a black-box byte stream, the response is decoded (in a way specific to the payload's content type) and its structure and content are analyzed. For instance, HTML web content is decoded as such, resulting in a logical HTML DOM tree, which is then compared to the logical structure of known good-content stored in the database for that URL, or to the logical policy rules configured for that URL allowing links (anchors), objects, scripts (client-side code) etc to be analyzed.

Analyzing the web content may also include extracting from the dynamic content static features and dynamic features. For example, the web content may be parsed allowing data contained therein to be extracted. Different (configurable) analysis rules can be applied to different pieces of data. For instance, a rule may specify that an HTML document must contain a certain tag, or a rule may be applied to validate every inline image contained in a PDF document.

This then allows determination as to whether the static and dynamic features have changed. Each piece of content (static feature), and each structural pattern, of the parsed content, is analyzed using the appropriate rule configured for that URL. Such features of the content can be analyzed similarly to the way top-level content (i.e., the payload returned by the origin host in an HTTP response) is analyzed.

Dynamic features can be analyzed to determine whether they conform to a predetermined format. A rule may be configured to determine whether the structure of a parsed document conforms to a certain configured format. In particular, a rule may be configured to determine whether an HTML (or XHTML) document's DOM tree structure has certain features. Such a rule contains a DOM tree schema. This is a custom structure similar to an XML schema (XSD) document, which specifies which elements may or must appear at each point in the tree, how many times they may or must appear, etc.

In accordance with some embodiments, analyzing the web content includes simulating a user experience with the web content in order to determine whether the user experience conforms to a predetermined authenticated experience. In such case, the analyzer software controls an instance of a standard Web browser. Different browsers are supported (e.g. Internet Explorer, Mozilla Firefox, Google Chrome) and the browser used may be configured according to the URL, or chosen automatically. The analyzer directs the controlled browser to access the URL requested by the client. The browser's network access is made through the custom proxy, which responds to its requests using the content currently under inspection, without accessing the origin server unnecessarily.

The analyzer then observes the browser's behavior during and after loading the requested URL. It can detect events such as automatic navigation (redirection) to another URL; requests to open new browser windows; attempts to run software such as Java, Flash, or Silverlight plugins; and attempts to access the machine running the browser using client-side scripts (attempts to access local files, the local clipboard, to open network connections, to interact with the user using pop-ups, etc.)

The analyzer determines whether the observed behavior of the browser is valid. It can identify behavior which is either intrinsically dangerous or malicious (e.g., attempting to access local files), or which deviates from the previously observed behavior of content served for the same URL by the origin server (e.g., requests to load a Flash application which did not exist before). If it detects behavior which is forbidden by the policy configured for this URL, it can apply any of the filtering or blocking behaviors available for content that does not pass an analysis check.

The browser controlled by the analyzer software is run in a VM (virtual machine) instance. This prevents the browser, and any malicious content which may be present in the response payload and which may be run by the browser, from attacking the proxy and analyzer software, or any third party. The VM instance can be restarted between analyses of separate content, and separate co-existing VM instances can be run in parallel to analyze different unrelated content. The number of instances is limited only by the hardware used. Each new instance that is started is identical; any changes (to the local OS and file system) made while an instance is running do not affect other instances, and are not saved when the instance is terminated. (This is a configurable feature of the VM software.) This prevents any malicious content which may run inside a browser analysis session from affecting the behavior and results of other analysis sessions which may be run in the future, even for the same content URL.

The browser simulation analysis can run one of several supported browsers and browser versions. Furthermore, the VM in which the browser runs can be configured to run any of several supported OSs (operating systems) and OS versions, which include the different versions of Windows, Mac OS X, and Linux. The specific OS and browser used in an analysis can be selected according to the User-Agent header present in the client's original HTTP request, which (if present) indicates the web browser and OS name and versions used by the client. The analyzer chooses the most similar combination of OS and browser available to best simulate the behavior that the client would experience if the web content were delivered to it unmodified by the proxy.

In accordance with some embodiments, analyzing the web content may include obtaining an image that the web content displays on a display device of the client and comparing the image with a predetermined representative image. Some kinds of content can be rendered to an in-memory image that is identical to their appearance when displayed in a browser. This includes image files and some other content such as plain text. The analyzer software can directly compute an image rendering of such content.

Other kinds of content cannot be rendered to an image by the analyzer software. Instead, they are passed to the simulator browser and the analyzer software then takes a screenshot of the simulating browser window. Once an image is obtained using one of these methods, it can be compared to an image stored in the database which is known to represent valid content served in the past from the URL requested by the client. The analyzer may require the two images (current and stored) to be precisely identical, or it may apply various image processing algorithms to determine whether the difference between the two images exceeds a preconfigured threshold.

The web content may be changed in order to improve performance. For example, the proxy software may be configured to change the web content served to the client (after it has passed the analysis checks described above). These changes do not alter the semantics of the web content, i.e. the behavior that it causes in the client receiving it. These changes cause the web content to be either delivered faster to the client, or to be loaded and parsed faster by the client's browser software. The changes may include:

Compressing the content by adding an HTTP Transfer-Encoding or Content-Encoding using gzip compression encoding. This is applied only if the content is not already compressed by the origin server (using gzip or another method such as the deflate algorithm). This reduces the size of the content payload that has to be transmitted over the network from the proxy to the client, and so reduces the time until the client finishes receiving the content.

Rewriting HTML, XHTML, Javascript and CSS content, as well as Javascript and CSS data embedded in HTML and XHTML document content, by "minifying" it. Minification refers to rewriting content in one of these formats in the shortest possible way without changing the content's semantics. This is done by e.g. removing insignificant whitespace, changing Javascript identifier strings (such as local variable names) to shorter ones, lower-casing HTML element names to achieve better compression of the HTML document, among other techniques. This reduces the size of the data that must be transferred from the proxy to the client, and so reduces the time necessary for it to be transferred.

Inlining content such as images, Javascript scripts, and CSS data linked from HTML and XHTML documents. If an HTML/XHTML document links to an external resource of one of these types in such a way that a browser displaying the document must also download and process the content of the external reference, and if the proxy software has seen this external content before and has a copy of it cached in its internal database, then it may replace the external link with an inline copy of the resource to which the link refers. This removes the client browser's necessity to perform another network request to load the external resource data, and so reduces the time necessary for the client browser to load and display an entire Web page with all the resources linked from it.

Although the invention has so far been described as a composite system, it will be appreciated that the HTTP analyzer 15 shown in FIGS. 1 and 2 may be a standalone module adapted for integration within an existing network. Such a standalone module is configured to identify whether web content stored in a repository coupled to the network may be suspicious prior to serving to a client requesting the web content via a data communications network.

Typically, the components of the HTTP analyzer 15 are realized by software. A custom HTTP proxy (gateway) is set up, and the DNS and/or routing rules of the client network are changed to route traffic between the client and the web server through this proxy. HTTP requests and responses intercepted by the proxy are parsed and passed to the analysis module, which runs any of the tests as described above, as configured for the URL being requested. The result of these tests determines whether the content is passed unmodified by the proxy or replaced by custom content (e.g. an error message), and whether an out-of-band alert message describing the content that failed the analysis check is generated.

Such alert messages are stored in the product's internal database, and can be displayed using the product's management user interface. The analysis module can also be configured to send a copy of every alert message, when it is generated, to an outside server using one of several methods, such as email or SMS.

It will be appreciated that the HTTP analyzer 15 can be customized as required to realize the inline or out-of-band network configurations described with reference to FIGS. 1 and 2. If the HTTP analyzer 15, based on its configuration and the results of the tests it may run on the content, decides that the content does not pass the policy rules configured for that URL, then depending on the configuration it may block the content so as not to forward it to the client. It may forward different content instead, such as an error message, or it may be configured to close the client network connection without returning a response. To this end, it may include a diverter coupled to the communications port for automatically redirecting the client to an alternative host storage device for uploading secure static web content if the web content does not operate as expected. An update unit may likewise be coupled to the communications port for changing the web content in order to improve performance.

It will also be understood that the HTTP analyzer according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A computer-implemented method for identifying whether web content stored in a repository deviates from authentic web content, wherein authentic web content is web content that is approved by authorized personnel of the web content prior to serving to a client requesting said web content, said method comprising:
    monitoring web communications to said repository;
    intercepting said web content prior to serving the client;
    analyzing the web content in a safe environment for establishing that the web content conforms to a predetermined standard; and
    alerting a web host serving the web content if the web content does not conform to said standard;
    wherein analyzing the web content includes:
        (a) determining whether the web content includes dynamic content and, if so, determining whether the dynamic content conforms to predetermined known data representative of authentic actions associated with said dynamic content;
        (b) extracting partial web content requested by the web browser;
        (c) performing a computer simulation on the partial web content;
        (d) if the computer simulation of the partial web content conforms to the predetermined authenticated experience relating to the partial web content, releasing the partial web content to the client while maintaining a copy for subsequent analysis; and
        (e) iteratively repeating operations (c) and (d) on cumulative partial web content upon receipt of additional partial web content.

2. A computer-implemented method for preventing web content stored in a repository from being served to a client requesting said web content, said method comprising:
    monitoring web communications to said repository;
    intercepting said web content prior to serving the client;
    analyzing the web content in a safe environment for establishing that the web content conforms to a predetermined standard; and
    serving the web content to the client only if the web content conforms to said standard;
    wherein analyzing the web content includes:
        (a) determining whether the web content includes dynamic content and, if so, determining whether the dynamic content conforms to predetermined known data representative of authentic actions associated with said dynamic content;
        (b) extracting partial web content requested by the web browser;
        (c) performing a computer simulation on the partial web content;
        (d) if the computer simulation of the partial web content conforms to the predetermined authenticated experience relating to the partial web content, releasing the partial web content to the client while maintaining a copy for subsequent analysis; and
        (e) iteratively repeating operations (c) and (d) on cumulative partial web content upon receipt of additional partial web content.

3. The method according to claim 1, wherein analyzing the web content includes determining whether static content has changed.

4. The method according to claim 3, wherein determining whether static content has changed includes computing a signature of the static content and comparing the signature with a known signature of valid content.

5. The method according to claim 1, including obtaining an identity of a web browser requesting the web content and performing a browser-specific simulation.

6. The method according to claim 1, wherein analyzing the web content includes obtaining an image that the web content displays on a display device of the client and comparing the image with a predetermined representative image.

7. The method according to claim 1, further including automatically redirecting the client to an alternative host storage device for uploading secure static web content if the web content does not operate as expected.

8. The method according to claim 1, further including changing the web content in order to improve performance.

9. A non-transitory computer readable storage medium storing computer program code for performing the method of claim 1 when said program is run on a computer.

10. A non-transitory computer readable storage medium storing computer program code for performing the method of claim 2 when said program is run on a computer.

11. The method according to claim 1, wherein determining whether the dynamic content conforms to a predetermined format includes decoding the web content as a logical HTML DOM tree, comparing the logical HTML DOM tree to a logical structure of known good-content stored in a database for said URL, or to logical policy rules configured for said URL allowing links, objects, scripts to be analyzed.

12. The method according to claim 2, wherein determining whether the dynamic content conforms to a predetermined format includes decoding the web content as a logical HTML DOM tree, comparing the logical HTML DOM tree to a logical structure of known good-content stored in a database for said URL, or to logical policy rules configured for said URL allowing links, objects, scripts to be analyzed.

* * * * *